US012463361B2

(12) United States Patent
Cao et al.

(10) Patent No.: US 12,463,361 B2
(45) Date of Patent: Nov. 4, 2025

(54) ELECTRICAL CONNECTOR WITH IMPROVED RELIABILITY, CONNECTOR ASSEMBLY, AND METHOD OF MAKING ELECTRICAL CONNECTOR

(71) Applicant: DONGGUAN LUXSHARE TECHNOLOGIES CO., LTD, Dongguan (CN)

(72) Inventors: Haihua Cao, Dongguan (CN); Qiongnan Chen, Dongguan (CN); Kaide Wang, Dongguan (CN); Zhiqiang Wang, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 397 days.

(21) Appl. No.: 18/088,020

(22) Filed: Dec. 23, 2022

(65) Prior Publication Data

US 2023/0369792 A1 Nov. 16, 2023

(30) Foreign Application Priority Data

May 12, 2022 (CN) ........................ 202210514349.1

(51) Int. Cl.
*H01R 12/72* (2011.01)
*H01R 12/51* (2011.01)

(52) U.S. Cl.
CPC ......... *H01R 12/724* (2013.01); *H01R 12/515* (2013.01)

(58) Field of Classification Search
CPC .. H01R 12/724; H01R 12/515; H01R 13/504; H01R 13/6335; H01R 4/023;
(Continued)

(56) References Cited

U.S. PATENT DOCUMENTS 6,746,255 B1 6/2004 Lee et al.
6,916,197 B1 * 7/2005 Wu .................... H01R 13/6335 439/484

(Continued)

FOREIGN PATENT DOCUMENTS

CN 201117922 Y 9/2008
CN 101118998 B 4/2011

(Continued)

*Primary Examiner* — Truc T Nguyen
(74) *Attorney, Agent, or Firm* — Birch, Stewart, Kolasch & Birch, LLP

(57) ABSTRACT

An electrical connector includes a first insulating body, a conductive unit, a cable and a second insulating body. The cable includes a transverse portion fixed to the conductive unit and a longitudinal portion bent from the transverse portion. The second insulating body includes a rear wall. The electrical connector includes a filling cavity between the first insulating body and the rear wall. A connection position of the cable and the conductive unit is located in the filling cavity. The rear wall includes an opening communicating with the filling cavity. The longitudinal portion of the cable at least partially corresponds to the opening, so as to reduce the compression of the cable by the rear wall and improve reliability. The electrical connector includes a filling block filled in the filling cavity. A method for manufacturing the electrical connector is also disclosed.

20 Claims, 18 Drawing Sheets

(58) Field of Classification Search
CPC ........ H01R 12/53; H01R 43/18; H01R 43/24; H01R 13/62; H01R 24/00; H01R 43/02; H01R 43/20
See application file for complete search history.

(56) References Cited

U.S. PATENT DOCUMENTS

| | | | | |
|---|---|---|---|---|
| 7,306,479 | B1 * | 12/2007 | Wu | H01R 13/6592 439/607.41 |
| 2006/0030215 | A1 * | 2/2006 | Wu | H01R 24/60 439/358 |
| 2010/0273335 | A1 * | 10/2010 | Wu | H01R 12/721 439/80 |
| 2011/0014815 | A1 * | 1/2011 | Zhu | H01R 24/58 439/620.21 |
| 2012/0100746 | A1 * | 4/2012 | Wu | H01R 13/506 439/607.31 |
| 2016/0006163 | A1 * | 1/2016 | Tashiro | H01R 13/5216 439/587 |
| 2016/0093974 | A1 * | 3/2016 | Lai | H01R 13/521 439/736 |
| 2016/0156145 | A1 * | 6/2016 | Kao | H01R 24/60 439/676 |
| 2016/0181722 | A1 * | 6/2016 | Tsai | H01R 13/5202 439/587 |
| 2016/0181723 | A1 * | 6/2016 | Tsai | H01R 13/5202 439/587 |
| 2018/0040969 | A1 * | 2/2018 | Wu | H01R 12/596 |
| 2022/0368077 | A1 * | 11/2022 | Little | H01R 4/023 |
| 2023/0208087 | A1 * | 6/2023 | Zhu | H01R 13/65912 439/248 |

FOREIGN PATENT DOCUMENTS

| | | | |
|---|---|---|---|
| CN | 210245775 | U | 4/2020 |
| CN | 111628320 | A | 9/2020 |
| CN | 211404907 | U | 9/2020 |
| CN | 212257868 | U | 12/2020 |
| CN | 114142323 | A | 3/2022 |
| CN | 216389866 | U | 4/2022 |
| JP | 8-130052 | A | 5/1996 |
| TW | I248240 | B | 1/2006 |
| TW | M443302 | U1 | 12/2012 |

* cited by examiner

ELECTRICAL CONNECTOR WITH IMPROVED RELIABILITY, CONNECTOR ASSEMBLY, AND METHOD OF MAKING ELECTRICAL CONNECTOR

CROSS-REFERENCE TO RELATED APPLICATION

This patent application claims priority of a Chinese Patent Application No. 202210514349.1, filed on May 12, 2022 and titled "ELECTRICAL CONNECTOR, CONNECTOR ASSEMBLY, AND METHOD OF MAKING ELECTRICAL CONNECTOR", the entire content of which is incorporated herein by reference.

TECHNICAL FIELD

The present disclosure relates to an electrical connector, a connector assembly and a manufacturing method of the electrical connector, which belongs to a technical field of connectors.

BACKGROUND

A connector assembly in the related art typically includes an electrical connector (e.g., a plug connector) and a mating connector (e.g., a receptacle connector). The electrical connector generally includes a first insulating body, a built-in circuit board, a cable soldered to the built-in circuit board, and a second insulating body. A sub-assembly of the built-in circuit board and the cable is sandwiched between the first insulating body and the second insulating body.

As the requirements for miniaturization of electrical connectors are getting higher and higher, how to control the overall length of the first insulating body and the second insulating body after assembly is a very important issue. In addition, in the related art, in order to shorten the overall length as much as possible, the second insulating body is designed to press against the cable as much as possible, which greatly reduces the reliability of the electrical connector.

SUMMARY

An object of the present disclosure is to provide a highly reliable electrical connector, a connector assembly and a method of making the electrical connector.

In order to achieve the above object, the present disclosure adopts the following technical solution: an electrical connector, including: a first insulating body including a main body portion and a mating space located at a front end of the main body portion; a conductive unit passing through the main body portion, the conductive unit including an insulating support member extending into the mating space, the insulating support member being provided with at least one conductive pad; a cable including a transverse portion fixed to the conductive unit and a longitudinal portion bent from the transverse portion; and a second insulating body assembled with the first insulating body, the second insulating body including a rear wall; wherein the electrical connector includes a filling cavity located between the main body portion and the rear wall in a front-rear direction, a connection position of the cable and the conductive unit is located in the filling cavity, the rear wall includes an opening communicating with the filling cavity and extending through the rear wall in the front-rear direction, at least part of the longitudinal portion of the cable corresponds to the opening; wherein the electrical connector further includes a filling block filled in the filling cavity, the filling block covers the connection position of the cable and the conductive unit, the filling block fills the opening to encapsulate the longitudinal portion corresponding to the opening within the electrical connector.

In order to achieve the above object, the present disclosure adopts the following technical solution: a connector assembly, including: a mating connector and the aforesaid electrical connector, the mating connector including: a mating insulating body including an insertion surface and an insertion slot extending through the insertion surface; at least one mating conductive terminal including an elastic mating arm extending into the insertion slot; and a metal shielding shell fixed to an outside of the mating insulating body; wherein when the electrical connector are mated with the mating connector, the mating insulating body is at least partially inserted into the mating space, the insulating support member of the conductive unit is at least partially inserted into the insertion slot, and the elastic mating arm is in contact with the at least one conductive pad.

In order to achieve the above object, the present disclosure adopts the following technical solution: a method of manufacturing the aforesaid electrical connector, the method including following steps: S1, providing the conductive unit and the cable, and soldering the cable to the conductive unit, the cable including a bent portion at a connection of the transverse portion and the longitudinal portion; S2, providing the first insulating body, and installing the conductive unit to the first insulating body; S3, providing the second insulating body, and assembling the second insulating body and the first insulating body; wherein the rear wall of the second insulating body includes an inner surface and an outer surface, the opening extends through the inner surface and the outer surface in the front-rear direction, the bent portion at least partially extends backwardly beyond the inner surface so as to extend into the opening; and S4, injecting an insulating material into the filling cavity to form the filling block, and the filling block filling the opening after solidification.

Compared with the prior art, the rear wall of the second insulating body of the present disclosure includes the opening which communicates with the filling cavity and extends through the rear wall along the front-rear direction. At least part of the longitudinal portion of the cable corresponds to the opening. With this arrangement, the compression of the cable by the rear wall can be reduced, thereby improving the reliability of the electrical connector.

DETAILED DESCRIPTION

Figure 1:
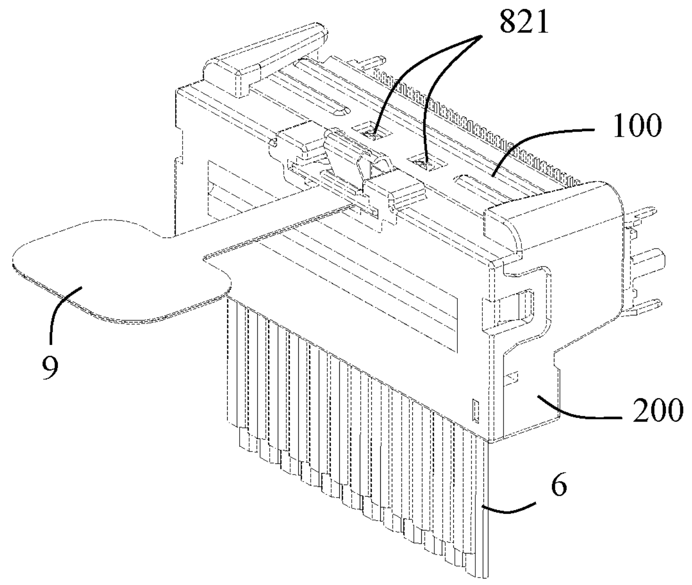
FIG. 1 is a schematic perspective view of a connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
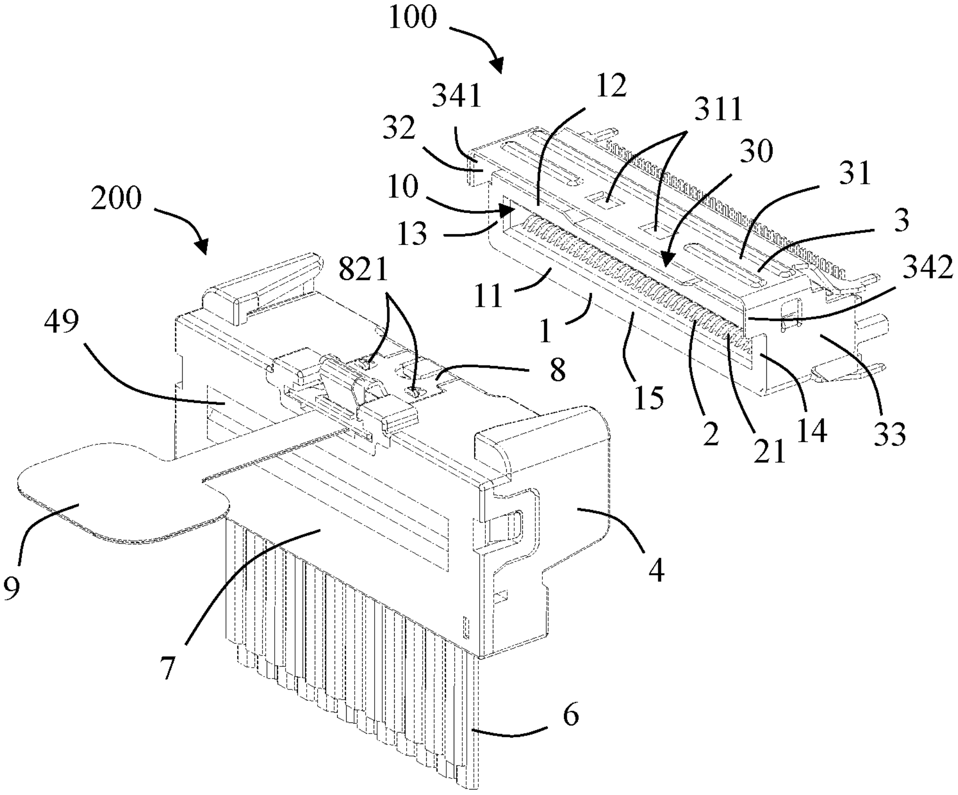
FIG. 2 is a perspective exploded view of FIG. 1.

Referring to FIGS. 1 and 2, the present disclosure discloses a connector assembly including a mating connector 100 and an electrical connector 200 matched with the mating connector 100. In an embodiment shown in the present disclosure, the mating connector 100 is an SFP (Small Form-Factor Pluggable) receptacle connector. The electrical connector 200 is an SFP plug connector. Of course, it is understandable to those skilled in the art that the mating connector 100 and the electrical connector 200 may also be other types of electrical connectors.

Referring to FIG. 2, the mating connector 100 includes a mating insulating body 1, a plurality of mating conductive terminals 2 and a metal shielding shell 3. The mating insulating body 1 includes an insertion surface 11 and an insertion slot 10 extending through the insertion surface 11. Specifically, the mating insulating body 1 includes a top wall portion 12, a first side wall portion 13, a second side wall portion 14 opposite to the first side wall portion 13, and a bottom wall portion 15 opposite to the top wall portion 12. The top wall portion 12, the first side wall portion 13, the second side wall portion 14 and the bottom wall portion 15 are enclosed to form the insertion slot 10.

Each mating conductive terminal 2 includes an elastic mating arm 21 extending into the insertion slot 10. In an embodiment of the present disclosure, the mating conductive terminals 2 are disposed in upper and lower rows, that is, the elastic mating arms 21 are disposed in the upper and lower rows and extend into the insertion slot 10.

The metal shielding shell 3 includes an upper wall 31 located at an upper end of the top wall portion 12, a first side end wall 32 bent downwardly from one side of the upper wall 31, and a second side end wall 33 bent downwardly from another side of the upper wall 31. The mating connector 100 includes a receiving cavity 30 located between the upper wall 31 and the top wall portion 12 in the top-bottom direction. The upper wall 31 includes two locking holes 311 spaced apart from each other along the left-right direction for locking with the electrical connector 200. The first side end wall 32 corresponds to the first side wall portion 13. The second side end wall 33 corresponds to the second side wall portion 14. The top wall portion 12 and the first side end wall 32 are jointly provided with a first L-shaped positioning protrusion 341 extending beyond the insertion surface 11. The top wall portion 12 and the second side end wall 33 are jointly provided with a second L-shaped positioning protrusion 342 extending beyond the insertion surface 11. The first L-shaped positioning protrusion 341 and the second L-shaped positioning protrusion 342 are located at an upper-left corner and an upper-right corner of the metal shielding shell 3, respectively. The first L-shaped positioning protrusion 341 and the second L-shaped positioning protrusion 342 are configured to be inserted into the electrical connector 200 to achieve positioning.

Referring to FIGS. 3 to 14, the electrical connector 200 includes a first insulating body 4, a conductive unit, a cable 6 fixed to the conductive unit, a second insulating body 7 matched with the first insulating body 4, a pull strap unlocking device 8 installed on the first insulating body 4, and a pull strap 9 connected with the pull strap unlocking device 8. In the embodiment shown in the present disclosure, the conductive unit is a built-in circuit board 5. Of course, in other embodiments, the conductive unit may also be conductive terminals or the like.

Figure 12:
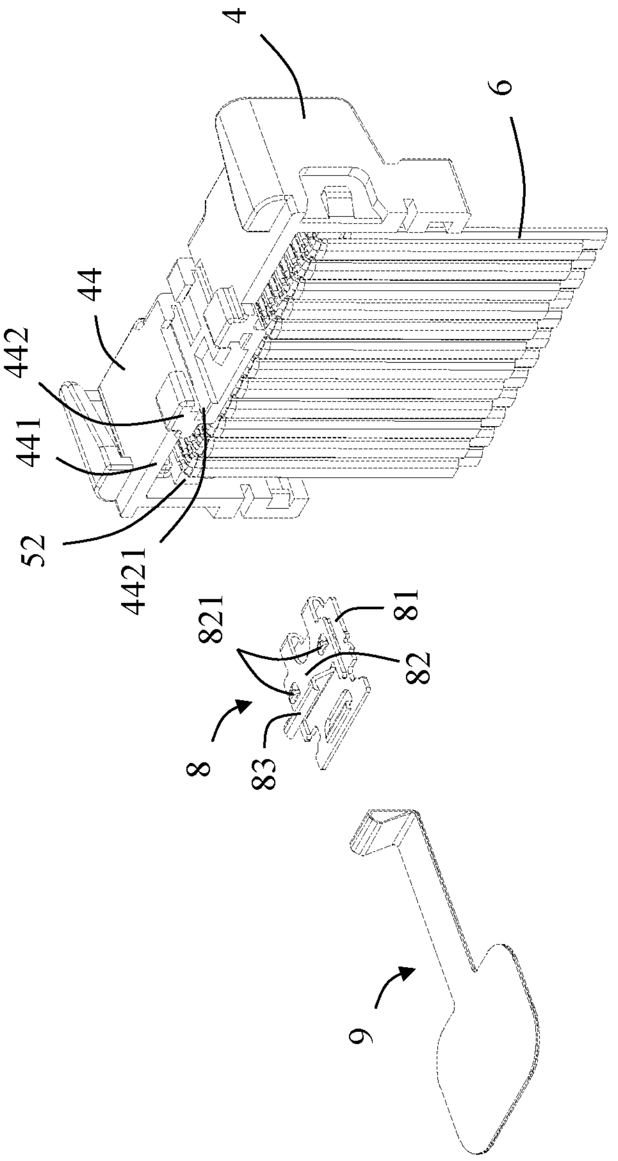
FIG. 12 is a partially exploded perspective view after removing a second insulating body and a filling block in FIG. 10.
Figure 13:
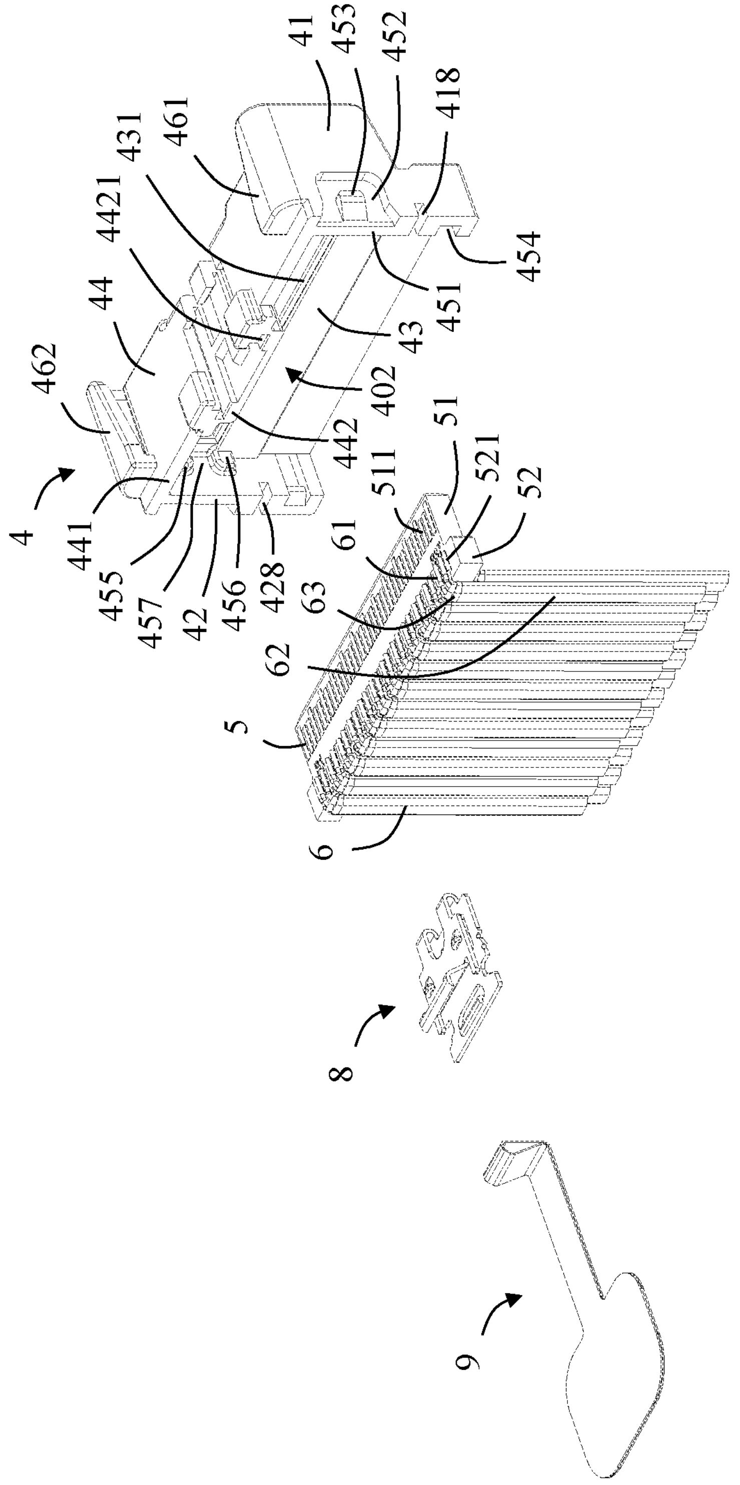
FIG. 13 is a further partial perspective exploded view of FIG. 12.
Figure 14:
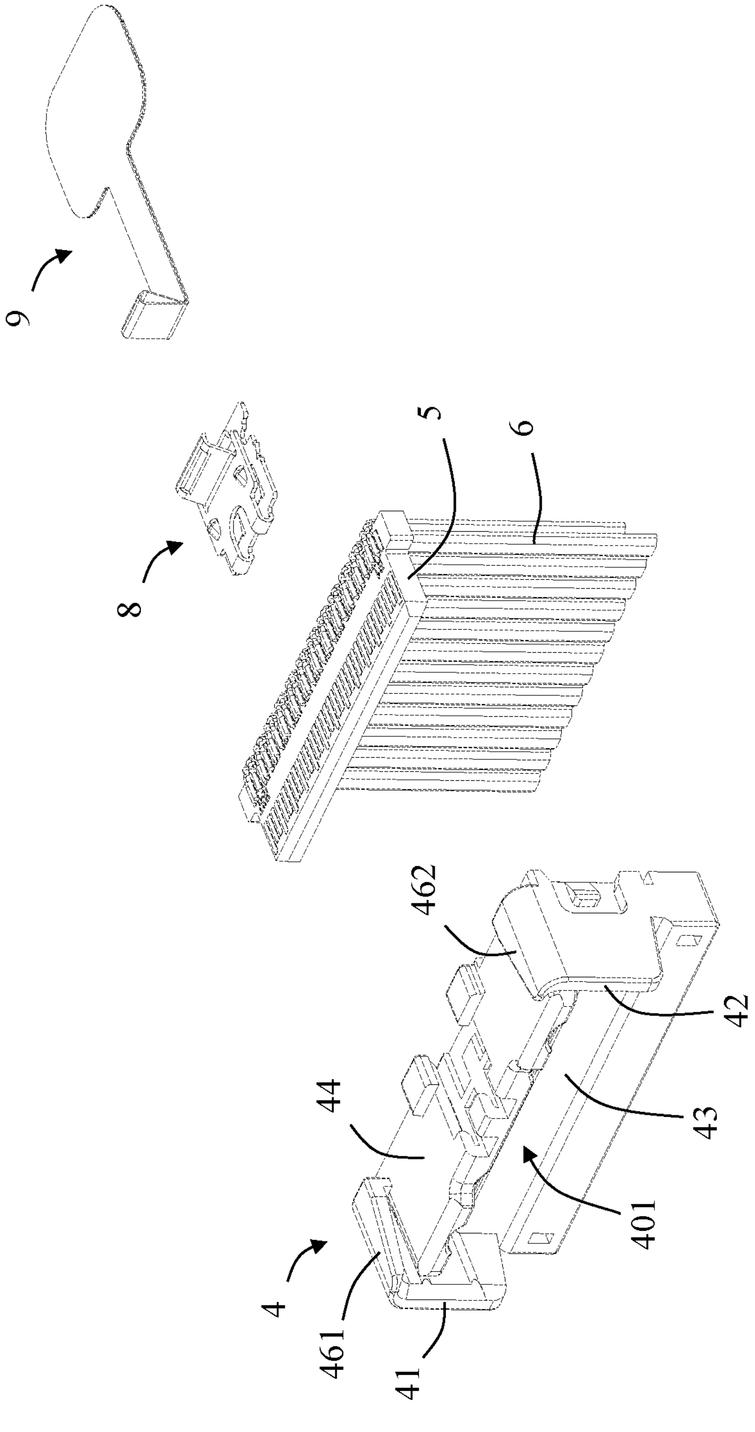
FIG. 14 is a partially exploded perspective view of FIG. 13 from another angle.

Referring to FIGS. 12 to 14, the first insulating body 4 includes a main body portion 43, a first side wall 41 located on one side of the main body portion 43, a second side wall 42 located on another side of the main body portion 43, a top wall 44 extending in the front-rear direction from a top of the main body portion 43, a mating space 401 located at a front end of the main body portion 43, and an accommodating space 402 located at a rear end of the main body portion 43. The mating space 401 is defined by at least the first side wall 41, the second side wall 42, the main body portion 43 and the top wall 44. The accommodating space 402 is defined by at least the first side wall 41, the second side wall 42, the main body portion 43 and the top wall 44. The mating space 401 and the accommodating space 402 are partitioned by the main body portion 43 in the front-rear direction. The main body portion 43 includes a slot 431 extending through the main body portion 43 along the front-rear direction. The slot 431 communicates the mating space 401 and the accommodating space 402 so as to facilitate the insertion of the built-in circuit board 5.

The first side wall 41 and/or the second side wall 42 includes a rear surface 451, a groove 452 recessed backwardly through the rear surface 451, a locking block 453 extending outwardly into the groove 452, and a locking hole 454 extending backwardly through the rear surface 451. Each of the first side wall 41 and the second side wall 42 is provided with a first block 455, a second block 456 located below the first block 455, and a locking slot 457 located between the first block 455 and the second block 456 in the top-bottom direction. The locking slot 457 is configured for positioning the built-in circuit board 5.

The top wall 44 of the first insulating body 4 includes a rear end surface 441. The top wall 44 includes a mounting protrusion 442 extending backwardly from the rear end surface 441. The mounting protrusion 442 includes a mounting groove 4421 extending backwardly. The pull strap unlocking device 8 is installed in the installation slot 4421. In the illustrated embodiment of the present disclosure, the rear end surface 441 and the rear surface 451 are located in a same vertical plane. The mounting protrusion 442 has a plurality of first stepped surfaces 4422 located at a bottom of the mounting protrusion 442. By arranging the first stepped surfaces 4422 instead of a flat surface, a wall thickness at each position on the mounting protrusion 442 can be flexibly adjusted, thereby avoiding structural strength problems caused by the wall thickness being too thin.

Figure 3:
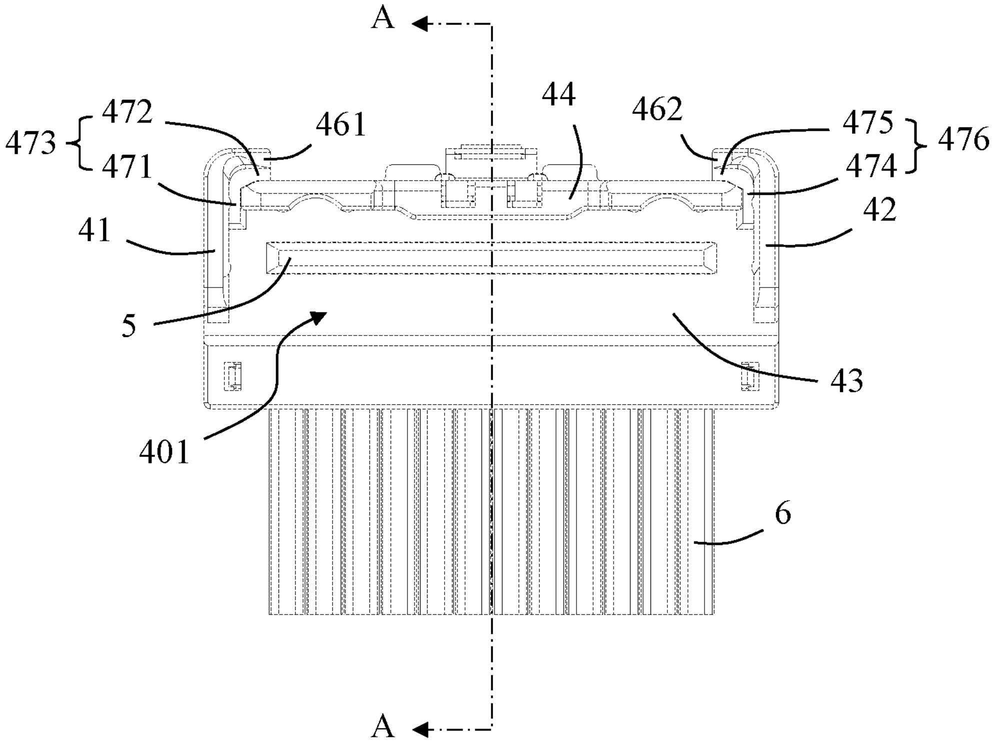
FIG. 3 is a front view of an electrical connector in accordance with an embodiment of the present disclosure.
Figure 4:
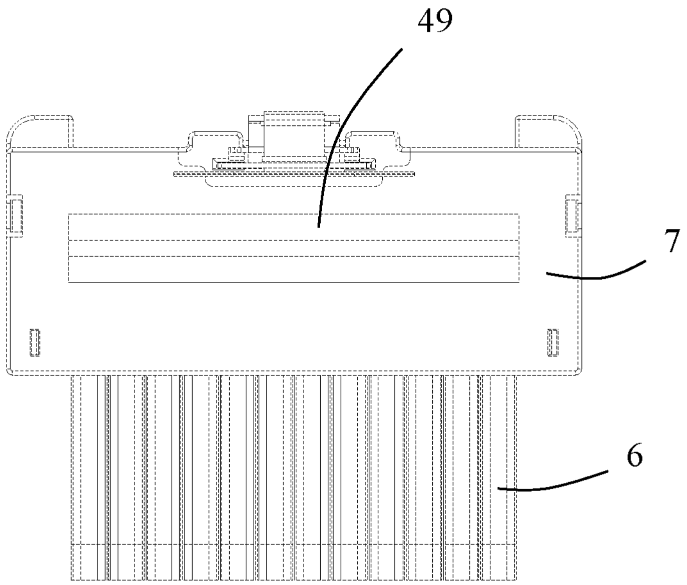
FIG. 4 is a rear view of the electrical connector in FIG. 2.
Figure 5:
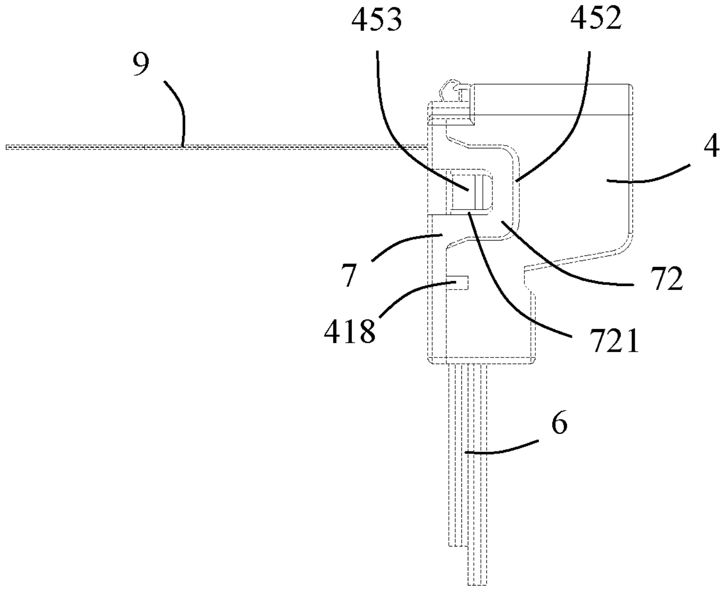
FIG. 5 is a right side view of the electrical connector in FIG. 2.
Figure 6:
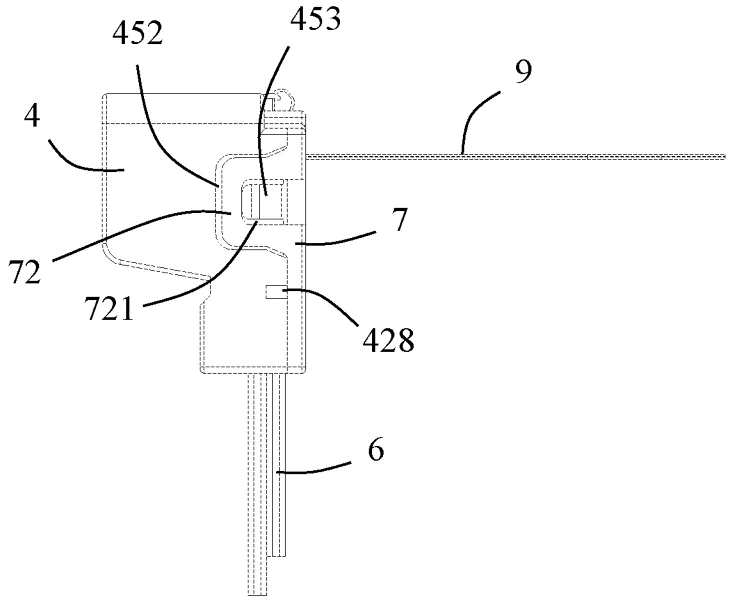
FIG. 6 is a left side view of the electrical connector in FIG. 2.
Figure 7:
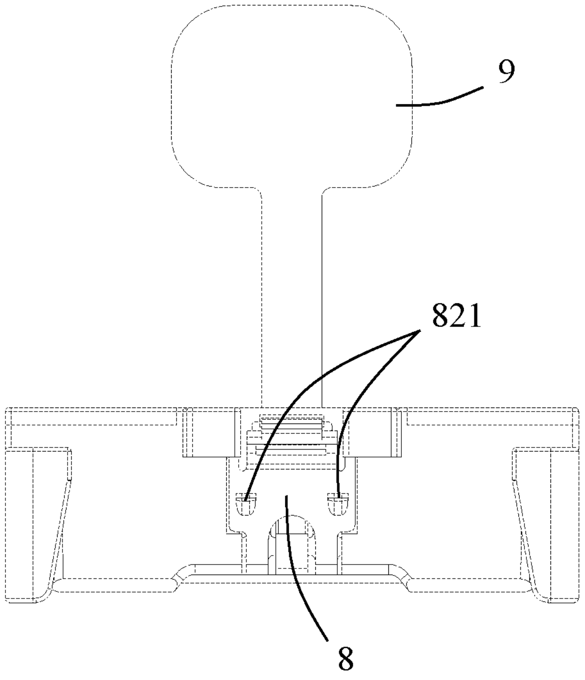
FIG. 7 is a top view of the electrical connector in FIG. 2.
Figure 8:
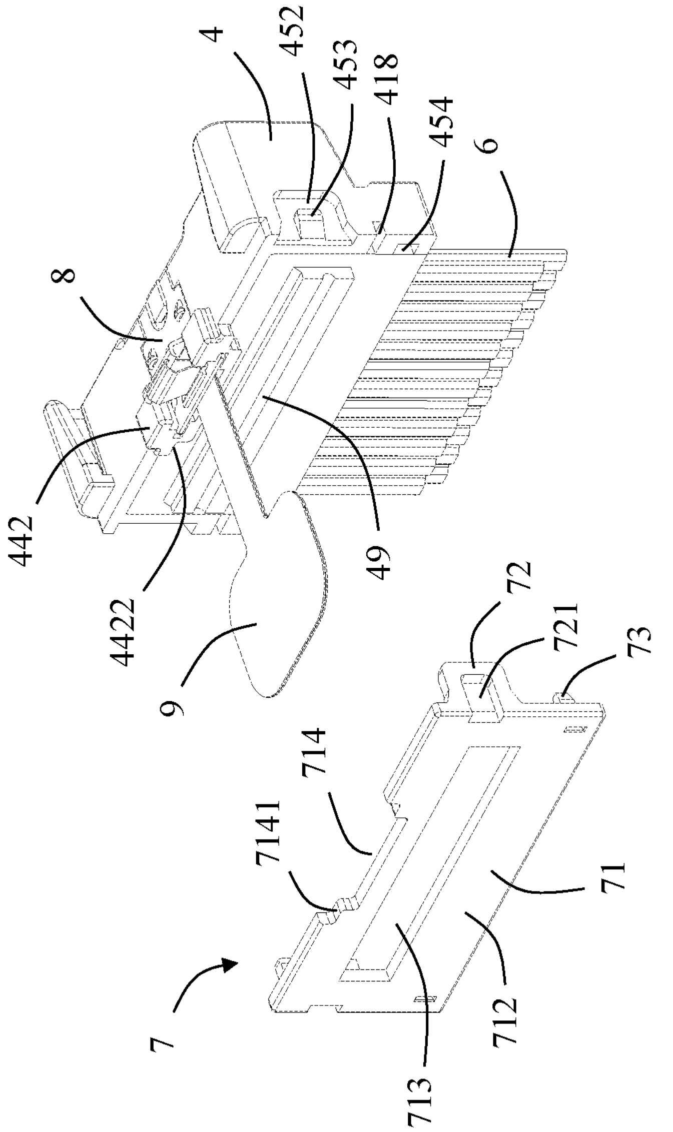
FIG. 8 is a partial perspective exploded view of the electrical connector in FIG. 2.
Figure 9:
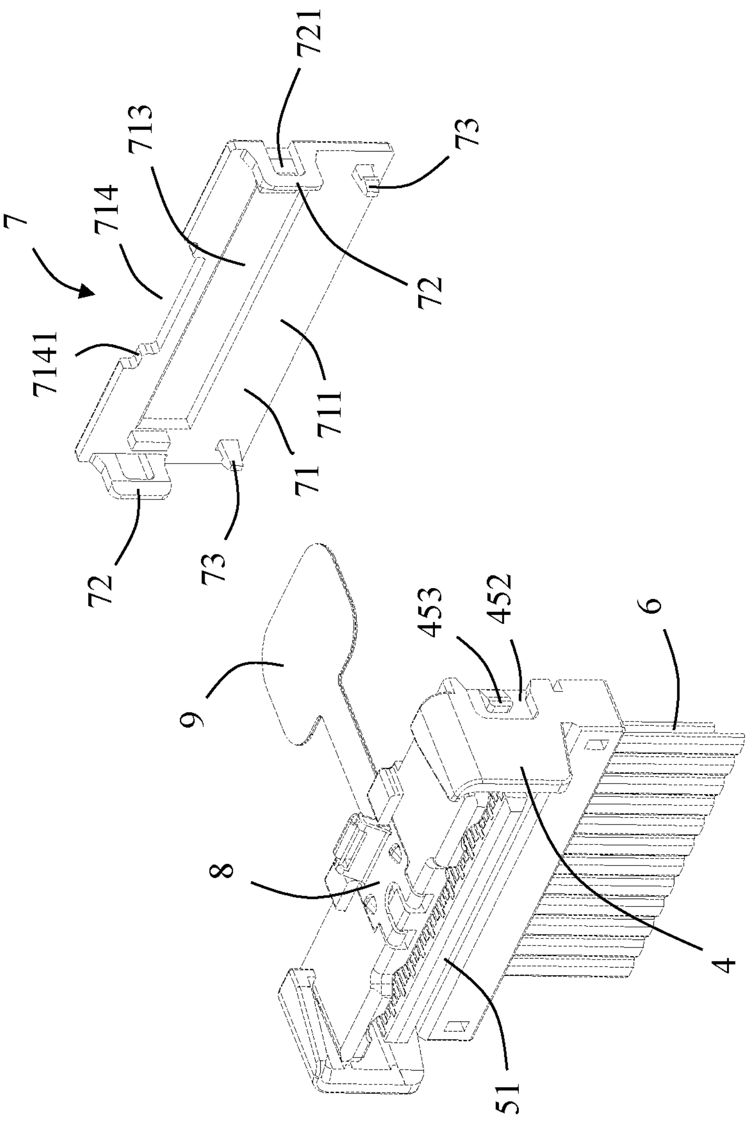
FIG. 9 is a partially exploded perspective view of FIG. 8 from another angle.
Figure 10:
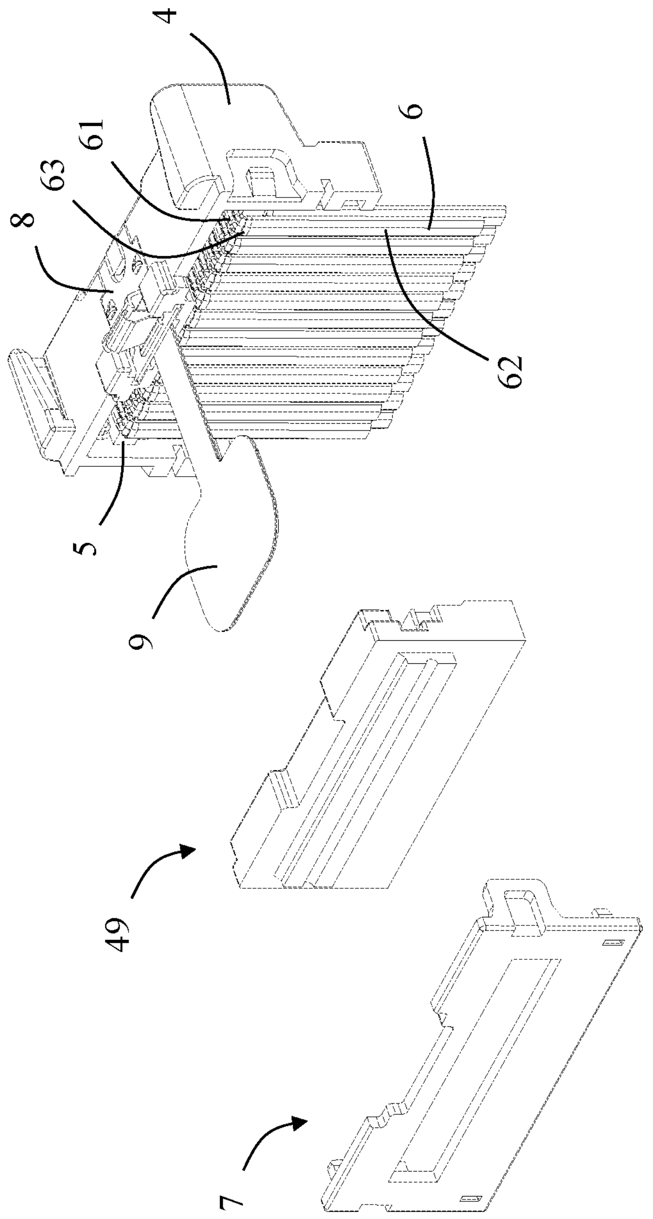
FIG. 10 is a further partial perspective exploded view of FIG. 8.
Figure 11:
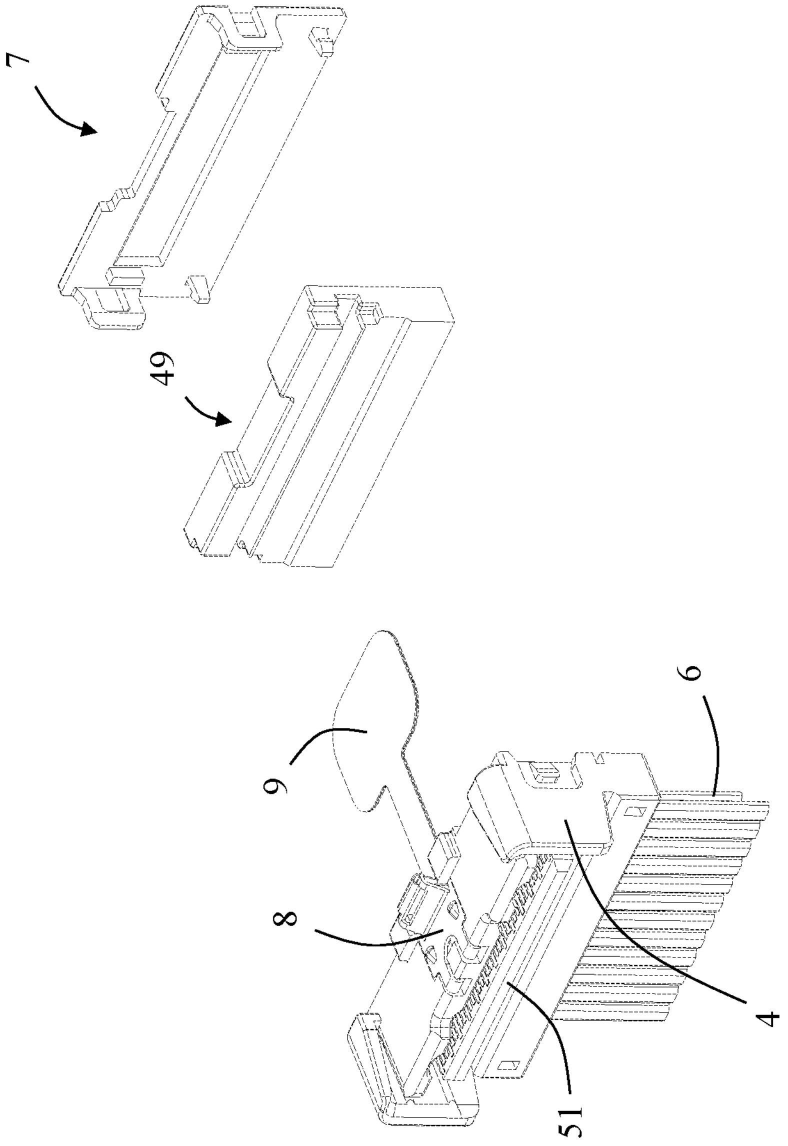
FIG. 11 is a partially exploded perspective view of FIG. 10 from another angle.

Besides, the first insulating body 4 includes a first extension portion 461 extending from a top of the first side wall 41 and extending toward the second side wall 42, and a second extension portion 462 extending from a top of the second side wall 42 and extending toward the first side wall 41. In the embodiment shown in the present disclosure, the first extension portion 461 is perpendicular to the first side wall 41, the second extension portion 462 is perpendicular to the second side wall 42, and both the first extension portion 461 and the second extension portion 462 are located above the top wall 44 and at least partially overlap the top wall 44 in the top-bottom direction. Referring to FIG. 3, in the embodiment shown in the present disclosure, the first side wall 41 and the first extension portion 461 are both disposed at intervals from the top wall 44. The first insulating body 4 includes a first vertical groove 471 located between the first side wall 41 and the top wall 44 in a left-right direction, and a first horizontal groove 472 located between the first extension portion 461 and the top wall 44 in the top-bottom direction. The first horizontal groove 471 and the first vertical groove 472 form a first L-shaped positioning groove 473. Similarly, the second side wall 42 and the second extension portion 462 are spaced apart from the top wall 44. The first insulating body 4 includes a second vertical groove 474 located between the second side wall 42 and the top wall 44 in the left-right direction, and a second horizontal groove 475 located between the second extension portion 462 and the top wall 44 in the top-bottom direction. The second horizontal groove 474 and the second vertical groove 475 form a second L-shaped positioning groove 476. Both the first L-shaped positioning groove 473 and the second L-shaped positioning groove 476 communicate with the mating space 401. The first L-shaped positioning groove 473 and the second L-shaped positioning groove 476 are configured to receive the first L-shaped positioning protrusion 341 and the second L-shaped positioning protrusion 342 of the mating connector 100 in order to reduce the shaking when the mating connector 100 and the electrical connector 200 are mated with each other, thereby improving the mating stability between the electrical connector 200 and the mating connector 100.

Referring to FIGS. 12 and 13, the built-in circuit board 5 includes an insulating support member 51 passing through the slot 432 and extending forwardly into the mating space 401, and a mounting portion 52 located at a rear end of the insulating support member 51. In the illustrated embodiment of the present disclosure, the insulating support member 51 is a tongue plate. The mounting portion 52 is fixed in the slot 457. In an embodiment of the present disclosure, the insulating support member 51 is provided with a mating portion 511. The mating portion 511 includes a plurality of conductive pads arranged at intervals. In the embodiment shown in the present disclosure, both upper and lower surfaces of the insulating support member 51 are provided with the mating portion 511. The mating portions 511 are exposed to the mating space 401 so as to be in contact with the elastic mating arms 21 of the mating conductive terminals 2. Upper and lower surfaces of the mounting portion 52 are respectively provided with a plurality of soldering pads 521 for being fixed to the cable 6. In the embodiment shown in the present disclosure, a width of the mounting portion 52 along the left-right direction is larger than a width of the insulating support member 51 along the left-right direction. In this way, when the built-in circuit board 5 is inserted into the slot 432, the mounting portion 52 can be blocked by the main body portion 43, so as to function as a position limiter. In addition, the wider mounting portion 52 facilitates the arrangement of the soldering pads 521. For example, it is beneficial to appropriately increase the distance between two adjacent soldering pads 521, thereby reducing the signal crosstalk and facilitating soldering with the cable 6.

In the embodiment shown in the present disclosure, a plurality of the cables 6 are provided and arranged in inner and outer layers. Each cable 6 is substantially L-shaped, wherein the cable 6 located on the outer layer includes a transverse portion 61 connected to the built-in circuit board 5, a longitudinal portion 62 bent from the transverse portion 61, and a bent portion 63 located at a connection of the transverse portion 61 and the longitudinal portion 62. The transverse portion 61 is configured for being soldered with the soldering pad 521, and the bent portion 63 is disposed adjacent to the transverse portion 61.

The second insulating body 7 includes a rear wall 71. The rear wall 71 includes an inner surface 711, an outer surface 712, and an opening 713 extending through the inner surface 711 and the outer surface 712 in the front-rear direction. The longitudinal portions 62 of the cables 6 located in the outer layer are arranged side by side in the left-right direction. A width of the opening 713 along the left-right direction is greater than or equal to a width occupied by the longitudinal portions 62 along the left-right direction. In other words, the longitudinal portions 62 of the cables 6 in the outer layer are completely exposed in the opening 713 in the left-right direction.

The second insulating body 7 further includes a protrusion 72 extending forwardly from the inner surface 711 of the rear wall 71. The protrusion 72 includes a locking groove 721. When the first insulating body 4 and the second insulating body 7 are assembled together, the protrusion 72 of the second insulating body 7 is received in the groove 452 of the first insulating body 4. The locking block 453 of the first insulating body 4 is locked in the locking groove 721 of the second insulating body 7. Besides, the second insulating body 7 further includes a hook portion 73 extending forwardly from the inner surface 711 of the rear wall 71. The hook portion 73 is locked in the locking hole 454.

The rear wall 71 includes a recessed groove 714 recessed from a top of the rear wall 71 and a second stepped surface 7141 located at a bottom of the recessed groove 714. When the first insulating body 4 and the second insulating body 7 are assembled together, the mounting protrusion 442 is clamped in the recessed groove 714 along the front-rear direction. The first stepped surface 4422 engages with the second stepped surface 7141. The inner surface 711 of the rear wall 71 engages with the rear end surface 441 of the first insulating body 4.

Figure 15:
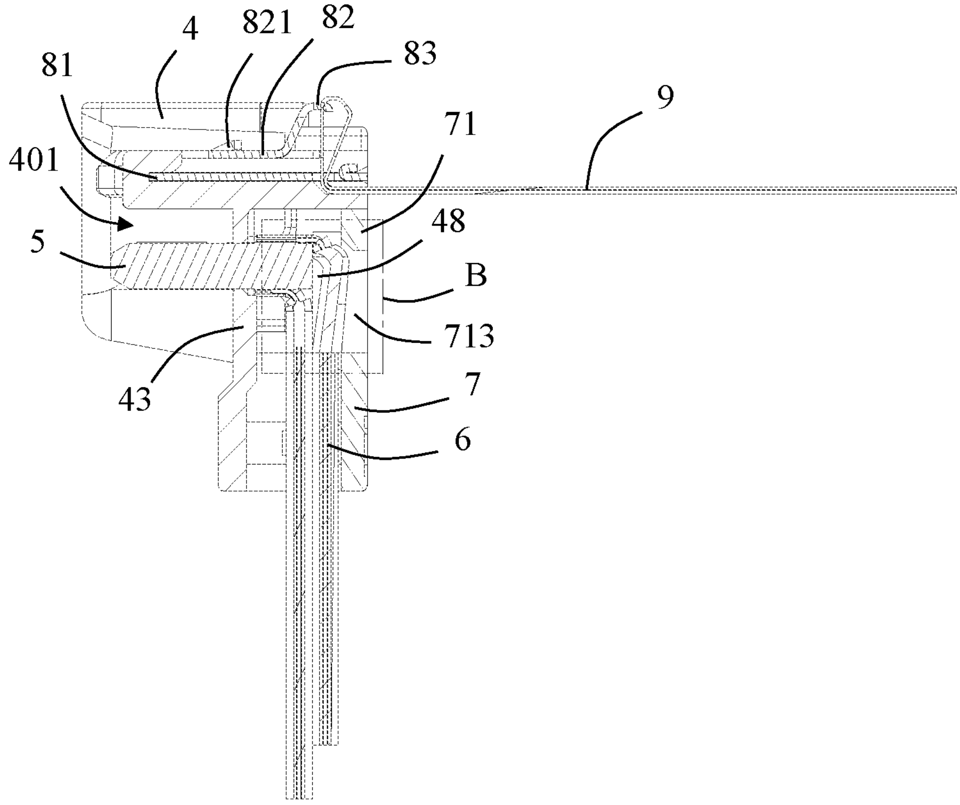
FIG. 15 is a schematic cross-sectional view of the electrical connector of the present disclosure before an insulating material is filled and taken along line A-A in FIG. 3.
Figure 16:
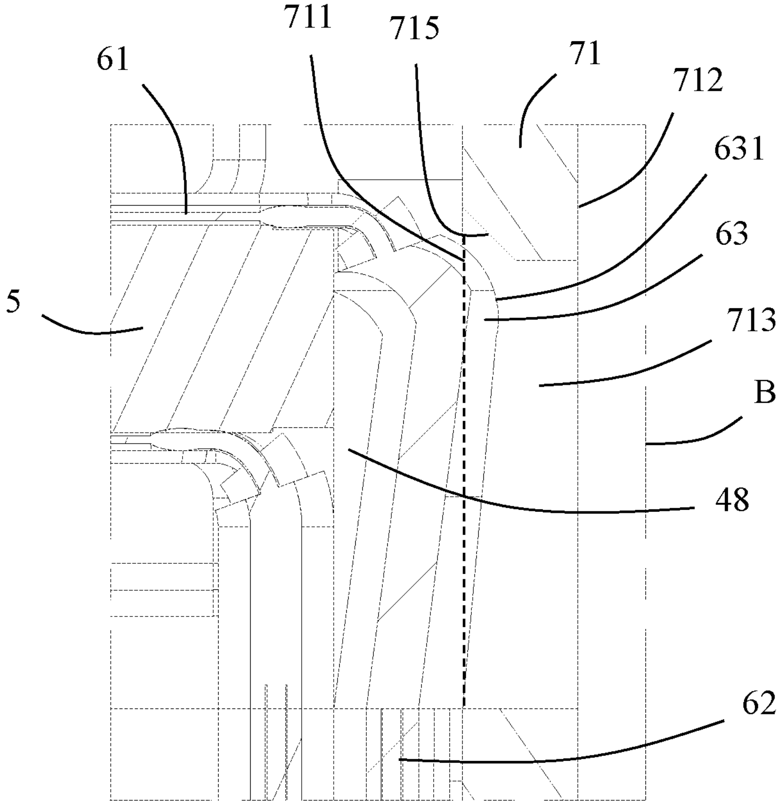
FIG. 16 is a partial enlarged view of a frame portion B in FIG. 15.

Referring to FIGS. 15 to 18, in the illustrated embodiment of the present disclosure, the rear wall 71 includes a sloping surface 715 exposed in the opening 713 and connected to the inner surface 711. The sloping surface 715 is inclined in a direction toward the bent portion 63, so that the opening 713 forms an enlarged opening adjacent to the bent portion 63. As a result, before injection molding, the bent portion 63 at least partially extends backwardly beyond the inner surface 711 and extends into the opening 713. The bent portion 63 includes a rear end surface 631. The rear end surface 631 of the bent portion 63 extends backwardly into the opening 713. Referring to FIGS. 15 and 16, by making the bent portion 63 at least partially extend into the opening 713, on the one hand, by providing the opening 713, the compression of the cable 6 by the rear wall 71 is reduced. Therefore, the risk of loosening or detachment at the soldering position of the transverse portion 61 and the soldering pad 521 due to the compression of the transverse portion 61 and/or the bent portion 63 of the cable 6 is reduced, thereby improving the reliability of the electrical connector 200.

Referring to FIGS. 15 to 18, the electrical connector 200 includes a filling cavity 48 located between the main body portion 43 and the rear wall 71 in the front-rear direction. A connection position of the cable 6 and the built-in circuit board 5 (e.g., a soldering position of the transverse portion 61 and the soldering pad 521) is located in the filling cavity 48. The opening 713 communicates with the filling cavity 48.

Figure 17:
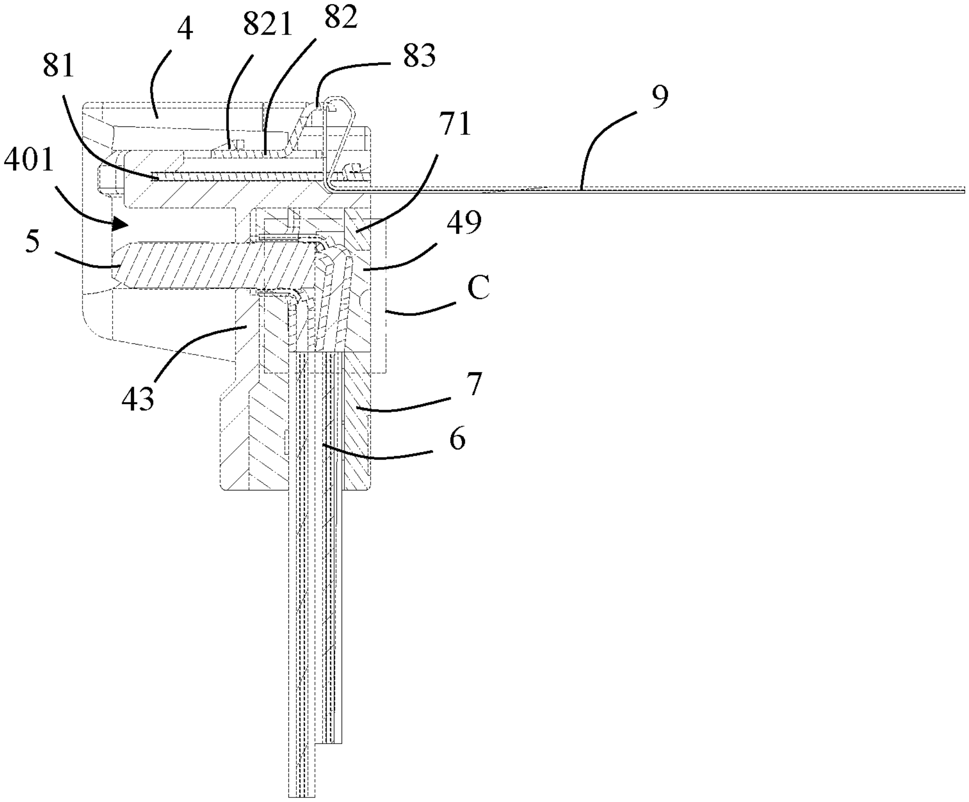
FIG. 17 is a schematic cross-sectional view of the electrical connector of the present disclosure after filling with the insulating material and along line A-A in FIG. 3.
Figure 18:
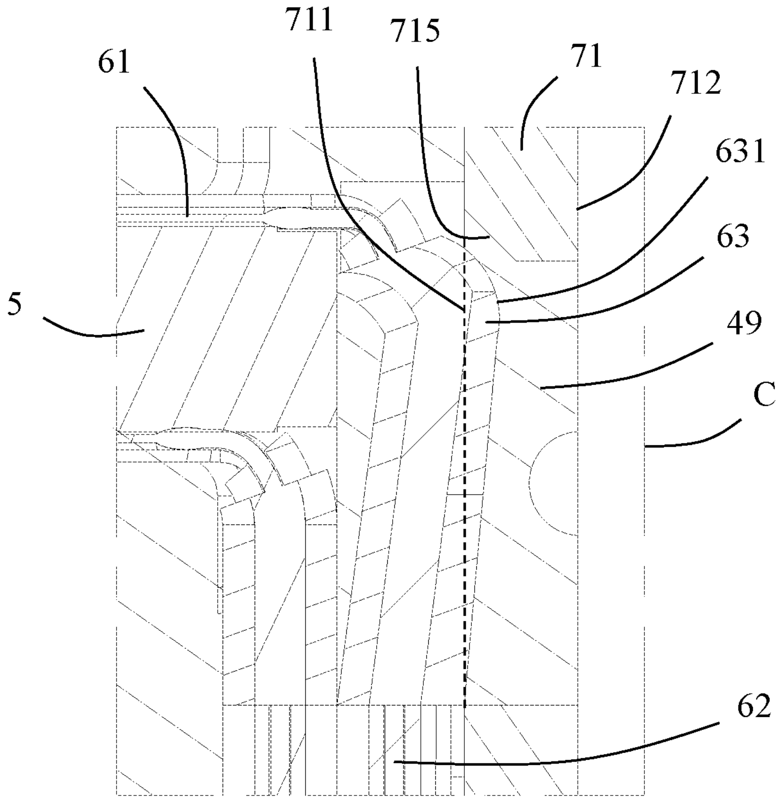
FIG. 18 is a partial enlarged view of a frame portion C in FIG. 17.

Referring to FIGS. 17 and 18, in the embodiment shown in the present disclosure, the electrical connector 200 further includes a filling block 49 filled in the filling cavity 48. The filling block 49 covers the connection position of the cable 6 and the built-in circuit board 5 to improve the connection strength. Besides, the filling block 49 fills the opening 713 to encapsulate the longitudinal portion 62 of the cable 6 corresponding to the opening 713 within the electrical connector 200. The first side wall 41 and/or the second side wall 42 is provided with an injection hole 418, 428 communicating with the filling cavity 48 to form the filling block 49 by injection molding. Of course, it is understandable to those skilled in the art that the injection hole can also be formed on the first insulating body 4; or the injection hole is partially formed on the first insulating body 4 and partially formed on the second insulating body 7.

When the electrical connector 200 is mated with the mating connector 100, the mating insulating body 1 is at least partially inserted into the mating space 401, the insulating support member 51 of the built-in circuit board 5 is at least partially inserted into the insertion slot 10, and the elastic mating arm 21 is in contact with the conductive pad to achieve electrical conduction.

Referring to FIG. 12, in an embodiment of the present disclosure, the pull strap unlocking device 8 is made of metal material and is generally U-shaped. The pull strap unlocking device 8 includes a fixing portion 81, a locking piece 82 bent upwardly and backwardly from a front end of the fixing portion 81, and a buckle portion 83 extending upwardly and backwardly from a rear end of the locking piece 82. The pull strap 9 is fastened to the buckle portion 83. The locking piece 82 includes two locking protrusions 821 extending upwardly. The buckle portion 83 extends upwardly beyond the locking protrusions 821. Since the pull strap unlocking device 8 is generally U-shaped, the locking piece 82 can be deformed downwardly under the pulling of the pull strap 9. The locking protrusions 821 are used for locking with the locking holes 311 of the mating connector 100. In the embodiment shown in the present disclosure, the two locking protrusions 821 are disposed side by side. Preferably, the locking protrusions 821 are stamped from the locking piece 82.

The present disclosure also discloses a method for manufacturing the aforementioned electrical connector 200. The method includes the following steps:

S1, providing the conductive unit (e.g., the built-in circuit board 5) and the cable 6, and soldering the cable 6 with the conductive unit; the cable 6 including a bent portion 63 at the connection of the transverse portion 61 and the longitudinal portion 62;

S2, providing the first insulating body 4, and installing the built-in circuit board 5 to the first insulating body 4;

S3, providing the second insulating body 7, and assembling the second insulating body 7 and the first insulating body 4 together; the rear wall 71 of the second insulating body 7 including an inner surface 711 and an outer surface 712, the opening 713 extending through the inner surface 711 and the outer surface 712 in the front-rear direction; the bent portion 63 at least partially extending backwardly beyond the inner surface 711 to extend into the opening 713; and S4, injecting an insulating material into the filling cavity 48 to form the filling block 49, and the filling block 49 filling the opening 713.

Specifically, in the step S3, the rear wall 71 includes a sloping surface 715 exposed in the opening 713 and connected with the inner surface 711. The sloping surface 715 is inclined toward the direction toward the bent portion 63 so that the rear end surface 631 of the bent portion 63 extends into the opening 713.

Compared with the prior art, the rear wall 71 of the second insulating body 7 of the present disclosure includes the opening 713 which communicates with the filling cavity 48 and extends through the rear wall 71 along the front-rear direction. At least part of the longitudinal portion 62 of the cable 6 corresponds to the opening 713. With this arrangement, the compression of the cable 6 by the rear wall 71 can be reduced, thereby improving the reliability of the electrical connector 200.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

a first insulating body comprising a main body portion and a mating space located at a first end of the main body portion;

a conductive unit passing through the main body portion, the conductive unit comprising an insulating support member extending into the mating space, the insulating support member being provided with at least one conductive pad;

a cable comprising a transverse portion fixed to the conductive unit and a longitudinal portion bent from the transverse portion; and a second insulating body assembled with the first insulating body, the second insulating body comprising an end wall;

wherein the electrical connector comprises a filling cavity located between the main body portion and the end wall in a first direction, a connection position of the cable and the conductive unit is located in the filling cavity, the end wall comprises an opening communicating with the filling cavity and extending through the end wall in the first direction, at least part of the longitudinal portion of the cable corresponds to the opening;

wherein the electrical connector further comprises a filling block filled in the filling cavity, the filling block covers the connection position of the cable and the conductive unit, the filling block fills the opening to encapsulate the longitudinal portion corresponding to the opening within the electrical connector;

wherein the filling block is filled in the filling cavity by injection molding so that the filling block is integral with the second insulating body.

2. The electrical connector according to claim 1, wherein the cable comprises a bent portion at a connection of the transverse portion and the longitudinal portion, the end wall comprises an inner surface and an outer surface, the opening extends through the inner surface and the outer surface in the first direction, the end wall comprises a sloping surface exposed in the opening and connected to the inner surface, and the sloping surface is inclined in a direction toward the bent portion to form an enlarged opening.

3. The electrical connector according to claim 1, wherein the cable comprises a plurality of the longitudinal portions disposed side by side in a second direction, a width of the opening along the second direction is greater than or equal to a width occupied by the longitudinal portions along the second direction.

4. The electrical connector according to claim 1, wherein the first insulating body comprises a first side wall located on one side of the main body portion, a second side wall located on another side of the main body portion, and a top wall extending in the first direction from a top of the main body portion; the mating space is defined by at least the first side wall, the second side wall, the main body portion and the top wall;

wherein the end wall of the second insulating body comprises an inner surface and an outer surface, and the opening extends through the inner surface and the outer surface in the first direction.

5. The electrical connector according to claim 4, wherein the first side wall and/or the second side wall comprise a rear surface, a groove extending backwardly through the rear surface, and a locking block extending into the groove; the second insulating body comprises a protrusion extending forwardly from the inner surface of the end wall, the protrusion comprises a locking groove, the protrusion is received in the groove, and the locking block is held in the locking groove.

6. The electrical connector according to claim 4, wherein the first side wall and/or the second side wall comprise a rear surface and a locking hole extending backwardly through the rear surface; the second insulating body comprises a hook portion extending forwardly from the inner surface of the end wall, and the hook portion is locked in the locking hole.

7. The electrical connector according to claim 4, wherein the first insulating body comprises a rear end face, the top wall comprises a mounting protrusion extending backwardly beyond the rear end surface, the mounting protrusion comprises a mounting groove, the electrical connector comprises a pull strap unlocking device installed in the mounting groove and a pull strap connected to the pull strap unlocking device, the mounting protrusion is provided with a first stepped surface located at a bottom of the mounting protrusion;

the end wall comprises a recessed groove recessed from a top of the end wall and a second stepped surface located at a bottom of the recessed groove, the mounting protrusion is clamped in the recessed groove along the first direction, the first stepped surface engages with the second stepped surface, and the inner surface of the end wall engages with the rear end surface of the first insulating body.

8. The electrical connector according to claim 4, wherein the first insulating body comprises a first extension portion extending from a top of the first side wall and extending toward the second side wall, and a second extension portion extending from a top of the second side wall and extending toward the first side wall; the first extension portion is perpendicular to the first side wall, the second extension portion is perpendicular to the second side wall, the first extension portion and the second extension portion are located above the top wall and are at least partially overlapped with the top wall in a top-bottom direction;

the first side wall and the first extension portion are spaced apart from the top wall, the first insulating body comprises a first vertical groove located between the first side wall and the top wall in the second direction, and a first horizontal groove located between the first extension portion and the top wall in the top-bottom direction, the first horizontal groove and the first vertical groove constitute a first L-shaped positioning groove;

the second side wall and the second extension portion are spaced apart from the top wall, the first insulating body comprises a second vertical groove located between the second side wall and the top wall in the second direction, and a second horizontal groove located between the second extension portion and the top wall in the top-bottom direction, the second horizontal groove and the second vertical groove form a second L-shaped positioning groove, the first L-shaped positioning groove and the second L-shaped positioning groove communicate with the mating space.

9. The electrical connector according to claim 4, wherein the first side wall and/or the second side wall is provided with an injection hole communicating with the filling cavity so as to form the filling block by injection molding.

10. The electrical connector according to claim 1, wherein the conductive unit is a built-in circuit board.

11. The electrical connector according to claim 2, wherein the bent portion extends at least partially into the opening; and wherein the bent portion comprises a rear end surface, and the rear end surface of the bent portion extends into the opening.

12. A connector assembly, comprising: a mating connector and an electrical connector, the electrical connector comprising:

a first insulating body comprising a main body portion and a mating space located at a first end of the main body portion;

a conductive unit passing through the main body portion, the conductive unit comprising an insulating support member extending into the mating space, the insulating support member being provided with at least one conductive pad;

a cable comprising a transverse portion fixed to the conductive unit and a longitudinal portion bent from the transverse portion; and a second insulating body assembled with the first insulating body, the second insulating body comprising an end wall;

wherein the electrical connector comprises a filling cavity located between the main body portion and the end wall in a first direction, a connection position of the cable and the conductive unit is located in the filling cavity, the end wall comprises an opening communicating with the filling cavity and extending through the end wall in the first direction, at least part of the longitudinal portion of the cable corresponds to the opening;

wherein the electrical connector further comprises a filling block filled in the filling cavity, the filling block covers the connection position of the cable and the conductive unit, the filling block fills the opening to encapsulate the longitudinal portion corresponding to the opening within the electrical connector;

the mating connector comprising:

a mating insulating body comprising an insertion surface and an insertion slot extending through the insertion surface;

at least one mating conductive terminal comprising an elastic mating arm extending into the insertion slot; and a metal shielding shell fixed to an outside of the mating insulating body;

wherein when the electrical connector are mated with the mating connector, the mating insulating body is at least partially inserted into the mating space, the insulating support member of the conductive unit is at least partially inserted into the insertion slot, and the elastic mating arm is in contact with the at least one conductive pad.

13. The connector assembly according to claim 12, wherein the cable comprises a bent portion at a connection of the transverse portion and the longitudinal portion, the end wall comprises an inner surface and an outer surface, the opening extends through the inner surface and the outer surface in the first direction, the end wall comprises a sloping surface exposed in the opening and connected to the inner surface, and the sloping surface is inclined in a direction toward the bent portion to form an enlarged opening.

14. The connector assembly according to claim 12, wherein the cable comprises a plurality of the longitudinal portions disposed side by side in a second direction, a width of the opening along the second direction is greater than or equal to a width occupied by the longitudinal portions along the second direction.

15. The connector assembly according to claim 12, wherein the first insulating body comprises a first side wall located on one side of the main body portion, a second side wall located on another side of the main body portion, and a top wall extending in the first direction from a top of the main body portion; the mating space is defined by at least the first side wall, the second side wall, the main body portion and the top wall;

wherein the end wall of the second insulating body comprises an inner surface and an outer surface, and the opening extends through the inner surface and the outer surface in the first direction.

16. The connector assembly according to claim 15, wherein the first side wall and/or the second side wall comprise a rear surface, a groove extending backwardly through the rear surface, and a locking block extending into the groove; the second insulating body comprises a protrusion extending forwardly from the inner surface of the end wall, the protrusion comprises a locking groove, the protrusion is received in the groove, and the locking block is held in the locking groove.

17. The connector assembly according to claim 15, wherein the first side wall and/or the second side wall is provided with an injection hole communicating with the filling cavity so as to form the filling block by injection molding.

18. The connector assembly according to claim 12, wherein the conductive unit is a built-in circuit board.

19. The connector assembly according to claim 13, wherein the bent portion extends at least partially into the opening; and wherein the bent portion comprises a rear end surface, and the rear end surface of the bent portion extends into the opening.

20. A method of manufacturing an electrical connector, the electrical connector comprising:

a first insulating body comprising a main body portion and a mating space located at a first end of the main body portion;

a conductive unit passing through the main body portion, the conductive unit comprising an insulating support member extending into the mating space, the insulating support member being provided with at least one conductive pad;

a cable comprising a transverse portion fixed to the conductive unit and a longitudinal portion bent from the transverse portion; and a second insulating body assembled with the first insulating body, the second insulating body comprising an end wall;

wherein the electrical connector comprises a filling cavity located between the main body portion and the end wall in a first direction, a connection position of the cable and the conductive unit is located in the filling cavity, the end wall comprises an opening communicating with the filling cavity and extending through the end wall in the first direction, at least part of the longitudinal portion of the cable corresponds to the opening;

wherein the electrical connector further comprises a filling block filled in the filling cavity, the filling block covers the connection position of the cable and the conductive unit, the filling block fills the opening to encapsulate the longitudinal portion corresponding to the opening within the electrical connector;

the method comprising following steps:

S1, providing the conductive unit and the cable, and soldering the cable to the conductive unit, the cable comprising a bent portion at a connection of the transverse portion and the longitudinal portion;

S2, providing the first insulating body, and installing the conductive unit to the first insulating body;

S3, providing the second insulating body, and assembling the second insulating body and the first insulating body; wherein the end wall of the second insulating body comprises an inner surface and an outer surface, the opening extends through the inner surface and the outer surface in the first direction, the bent portion at least partially extends beyond the inner surface so as to extend into the opening; and S4, injecting an insulating material into the filling cavity to form the filling block, and the filling block filling the opening after solidification.

* * * * *